No. 819,559. PATENTED MAY 1, 1906.
J. LA COS.
CIRCUIT BREAKER.
APPLICATION FILED AUG. 25, 1904.

WITNESSES: INVENTOR:
Joseph La Cos,
by Albert G. Davis
Atty.

UNITED STATES PATENT OFFICE.

JOSEPH LA COS, OF SCHENECTADY, NEW YORK, ASSIGNOR TO GENERAL ELECTRIC COMPANY, A CORPORATION OF NEW YORK.

CIRCUIT-BREAKER.

No. 819,559.     Specification of Letters Patent.     Patented May 1. 1906.

Application filed August 25, 1904. Serial No. 222,082.

*To all whom it may concern:*

Be it known that I, JOSEPH LA COS, a citizen of the United States, residing at Schenectady, county of Schenectady, State of New York, have invented certain new and useful Improvements in Circuit-Breakers, of which the following is a specification.

This invention relates to electric switches, and especially to those which are provided with an overload tripping-coil by which they are automatically opened in case an abnormally heavy current comes on the circuit. The tripping-coil is usually arranged to attract a pivoted armature, which is connected by a rod with a pivoted latch engaging with an arm on a movable contact-carrier controlling the circuit. A spring urges the carrier in a direction to open the circuit when the latch is disengaged from the arm. The latch is armed with a hard-steel tooth having a V-shaped edge. In circuit-breakers as heretofore constructed this tooth abuts against the free end of a dog of case-hardened steel pivoted on the arm and capable of vibrating within certain limits. When the circuit-breaker is closed, the dog cants downward, so that its meeting-point with the tooth of the latch is slightly below the line joining the pivots of the latch and dog. These two parts, therefore, form a locked toggle. When the latch is lifted by the overload-coil, the dog tilts upward, the toggle is broken, and the tooth of the latch slips off the end of the dog and leaves the switch free to be opened by the spring.

It has been found that in case the dog happens to be soft from faulty hardening the sharp end of the tooth is liable to cut into it, so that the tooth will not slip off and release the switch. This is likely to cause serious damage by preventing the opening of the circuit on an overload; and the object of my invention is to remedy the trouble by providing a latch-engaging device which cannot possibly stick and is absolutely sure to release.

Figure 1:
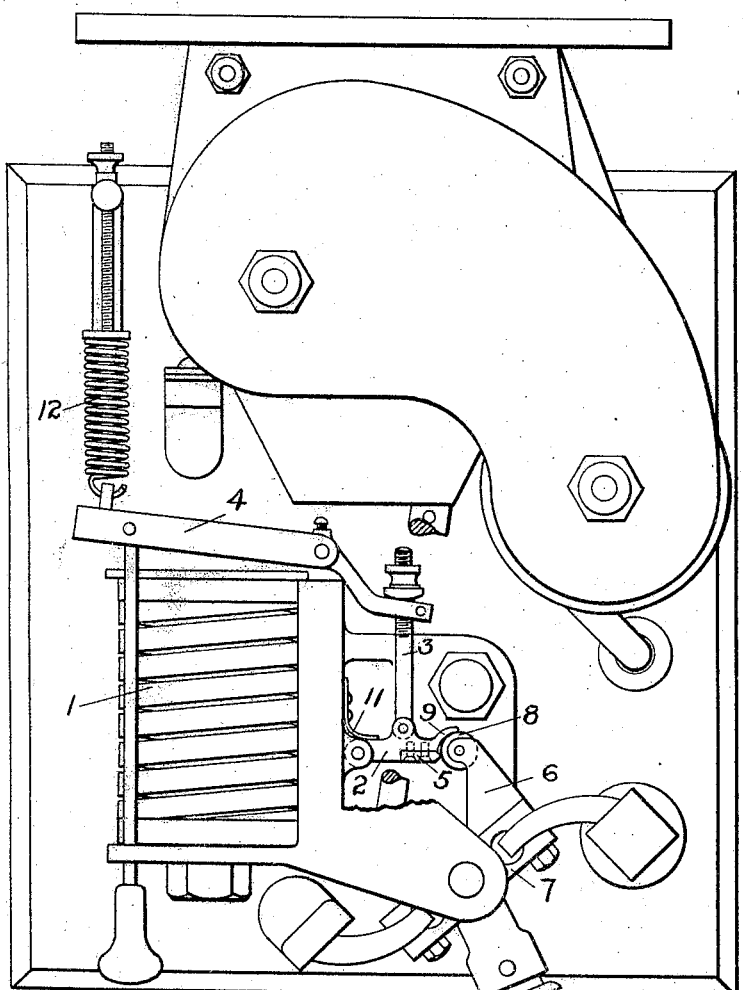
Figure 2:
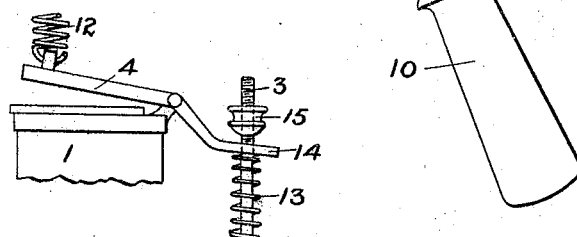

In the accompanying drawings, Figure 1 is a front elevation of a circuit-breaker, partly broken away to disclose my invention; and Fig. 2 shows a modification.

The several parts are nearly all of standard construction and need not be described in detail. On the frame of the overload-coil 1 is pivoted the latch 2, connected by the rod 3 with the pivoted armature 4 of the coil, as usual. The latch is armed with the customary hard-steel tooth 5, having a V-shaped edge. In the arm 6, which projects from the pivoted contact-carrier 7, is pivoted a cylindrical roller 8, preferably of hardened steel. The latch has a horn 9, which rests on the roller when the switch is closed, as shown in the drawings, the parts being arrested with the tooth just below the dead-center line.

The operation is as follows: When the handle 10 is moved to the left to close the switch, the arm passes up past the latch until the latter is forced by gravity and a flat spring 11 into the position illustrated, with the horn 9 resting on the roller and the tooth 5 engaging the periphery of the roller at a point slightly below the dead-center—that is, the straight line joining the pivots of the latch and the roller. The spring which opens the circuit-breaker constantly urges the arm 6 toward the left and presses the roller against the tooth. This tends to force the latch downward; but this tendency is resisted by the horn 9, so that the parts remain locked in the position shown. When an overload comes on, the coil attracts its armature with sufficient strength to overcome the tension of the spring 12, and by means of the rod 3 it lifts the latch. The instant the point of the tooth rises above the dead-center line joining the pivots of the latch and the roller the pressure exerted by the opening-spring throws the arm 6 to the left, and the tooth rides up on the roller, which turns freely and offers no resistance to the movement of the arm. It will thus be seen that no matter how deeply the tooth may bite into the periphery of the roller the parts cannot lock above the dead-center line, and hence the circuit-breaker is always sure to open.

In the modification shown in Fig. 2 the spring 11 is dispensed with and in place or it a light helical spring 13 is placed on the rod 3, abutting between the latch and the arm 14 of the armature 4. The adjusting-nut 15 on the rod 3 is set to leave some play between itself and the arm 14 when the parts stand in the position illustrated. The arm exerts sufficient pressure on the spring to cause it to hold the latch down with enough force to engage promptly with the arm 6 when the switch is closed; but when the breaker is tripped the armature can rise freely, and striking the nut disengages the latch with a hammer-blow. Moreover, the spring 13 does not put any additional load on the coil 1, whereas the flat spring 11 does exert a constant load thereon.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination with a pivoted arm, of a roller pivoted in said arm, a pivoted latch having a tooth to engage the periphery of the roller, and a horn on said latch adapted to rest on said roller.

2. In a circuit-breaker, the combination with a movable element, of a roller pivoted therein, a pivoted latch having a tooth engaging with the periphery of said roller, and means for engaging the roller to arrest said parts with the tooth just below the line joining the pivots of the roller and the latch.

3. In a circuit-breaker, the combination with the movable contact-carrier, of an arm thereon, a roller pivoted in said arm, and a latch to hold the circuit-breaker closed, provided with a tooth bearing against the periphery of said roller.

4. In a circuit-breaker, the combination with the movable contact-carrier, of an arm thereon, a roller pivoted in said arm, a latch to hold the circuit-breaker closed, provided with a tooth bearing against the periphery of said roller, and a horn on said latch to rest on said roller.

5. In a circuit-breaker, the combination with a pivoted latch and an overload-coil armature having an arm, of a rod attached to said latch and passing through said arm, a nut on the rod adjacent to but not touching said arm when the breaker is closed, and a helical spring surrounding said rod between the arm and the latch.

In witness whereof I have hereunto set my hand this 24th day of August, 1904.

JOSEPH LA COS.

Witnesses:
BENJAMIN B. HULL,
HELEN ORFORD.